United States Patent [19]

Nakatsuji et al.

[11] 3,792,424

[45] Feb. 12, 1974

[54] APPARATUS FOR DETECTING THE POSITION OF A MOVABLE ARTICLE UNDER WATER

[75] Inventors: Shinichi Nakatsuji, Chigasaki-shi; Keisuke Suzuki, Hiratsuka-shi, both of Japan

[73] Assignee: Kabushiki Kaisha Komatsu Seisakusho, Tokyo, Japan

[22] Filed: Oct. 13, 1971

[21] Appl. No.: 188,859

[30] Foreign Application Priority Data
Oct. 13, 1970 Japan.............................. 45-89291

[52] U.S. Cl................................................ 340/6 R
[51] Int. Cl................................................ G01s 5/18
[58] Field of Search ........... 340/5 R, 6 R, 16 R, 1 C

[56] References Cited
UNITED STATES PATENTS

| | | | |
|---|---|---|---|
| 3,421,138 | 1/1969 | Moulin et al......................... | 340/5 R |
| 3,205,475 | 9/1965 | Foss.................................... | 340/6 R |
| 3,161,255 | 12/1964 | Balise, Jr............................ | 340/8 S |
| 3,383,651 | 5/1968 | Koblick............................... | 340/6 R |

Primary Examiner—Richard A. Farley
Attorney, Agent, or Firm—Armstrong & Wegner

[57] ABSTRACT

An apparatus for detecting the position of a movable article under water which has at least three ultrasonic receivers equidistantly spaced around a standard point provided on the bottom of the body of water, an ultrasonic transmitter mounted onto the movable article for transmitting pulse ultrasonic waves, means for measuring the difference in the time when the receiver initially receives the ultrasonic wave and the time when the respective receivers receive the ultrasonic wave, and means for calculating the position of the movable article from the receiver initially receiving the ultrasonic wave and the standard point as a standard from the measured result of the measuring means. Thus, the apparatus of this invention may measure the position of the movable article under water regardless of the affect of the reflection of the ultrasonic wave from the rock, etc. on the bottom of the sea.

4 Claims, 7 Drawing Figures

TRANSMITTER

MEASURER

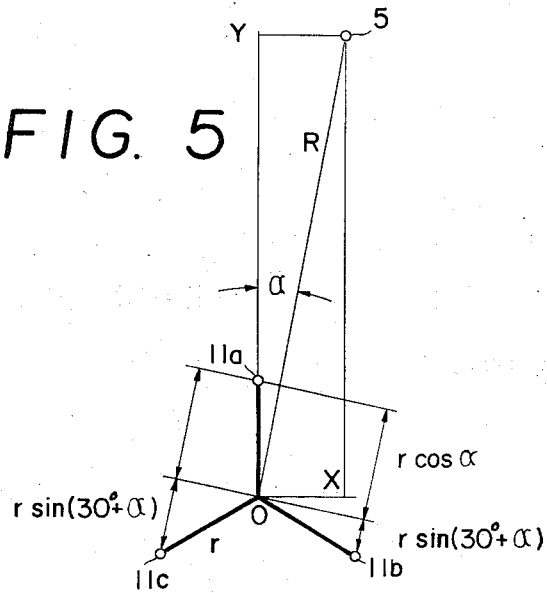
FIG. 5
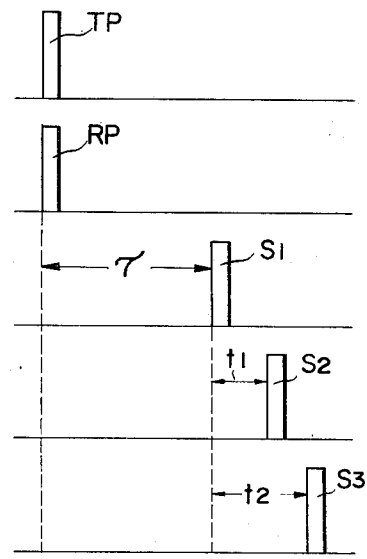
FIG. 6
FIG. 7
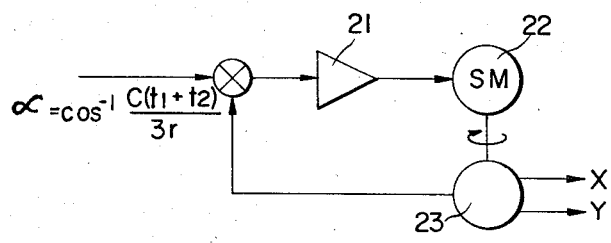

APPARATUS FOR DETECTING THE POSITION OF A MOVABLE ARTICLE UNDER WATER

This invention relates to an apparatus for detecting the position of a movable article under water utilizing an ultrasonic wave.

The development of oceans for putting the resources on the bottom of the sea to practical use has recently grow prosperous. When such development of the bottom of the sea is conducted, it is often required that an under-water service car or vehicle be operated beneath the surface in order to work under water. In such case, it is necessary to accurately know the position of the service car under water so as to permit smooth operation and to eliminate under sea dangers. This is particularly important in the event that the under-water service vehicle is driven by a remote control without a human operator.

Heretofore, for example, has been known a device which has a PPI sonar, five transponders (one of which is mounted onto the under-water service car), wherein an ultrasonic wave is transmitted from the PPI sonar and is received by the transponders and is returned to the PPI sonar for indicating the position of the service car on a cathod ray tube for the detection of the movable article or under-water service car beneath the water. However, in such method, an echo is reflected from projections such as rocks existing around the under-water service car on the bottom of the sea. As a result, it is very difficult to discriminate between the projections and the under-water service car, and accordingly the conventional device has a disadvantage such that it is impossible to accurately measure the position of the service car under water.

This invention contemplates the elimination of the aforementioned disadvantages of the conventional device and has as an object the provision of an apparatus for detecting the position of a movable article under water which may positively measure the position of the movable article under water without being affected by the echo of rocks, etc. on the bottom of the sea.

Briefly, in accordance with this invention, the foregoing and other objects, features and advantages are attained by the provision of an apparatus for detecting the position of a movable article under water which comprises at least three ultrasonic receivers equidistantly disposed around a standard point provided on the bottom of the body of water, an ultrasonic transmitter mounted onto the movable article for transmitting pulse ultrasonic waves, means for measuring the difference of the time when the receiver initially receives the ultrasonic wave and the time when the respective receivers recive the ultrasonic wave, and means for calculating the position of the movable article from the receiver initially receives the ultrasonic wave and the standard point as a standard from the measured result of the measuring means.

A more complete appreciation of the invention will be readily obtained as the same becomes better understood by reference to the following detailed description when taken in conjunction with the accompanying drawings, wherein:

FIG. 5 is a graphical representation of the relationship of the relative position of the transmitter and receivers of this invention;

FIG. 6 is a graphical representation of the timing relations of the trigger pulse, transmitting pulse and received pulses of the apparatus of this invention; and FIG. 7 is a block diagram of another example of the measuring portion of the apparatus of this invention.

Reference is now made to the drawings, which show one embodiment of the apparatus for detecting the position of a movable article under water of this invention.

Figure 1:
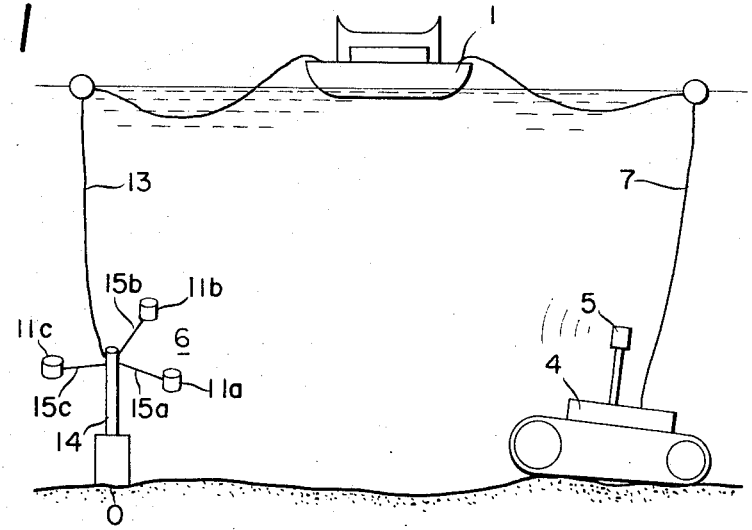
FIG. 1 is a schematic view of overall arrangement of the apparatus of this invention.
Figure 2:
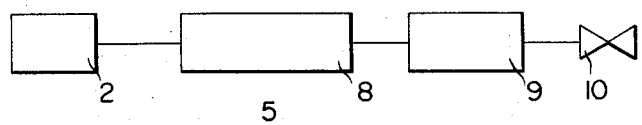
FIG. 2 is a block diagram of the transmitter of the apparatus of this invention.
Figure 3:
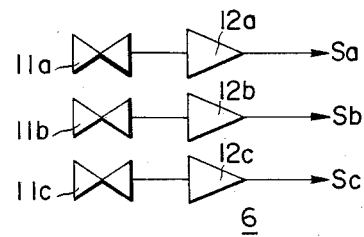
FIG. 3 is a block diagram of the receiver of the apparatus of this invention.
Figure 4:
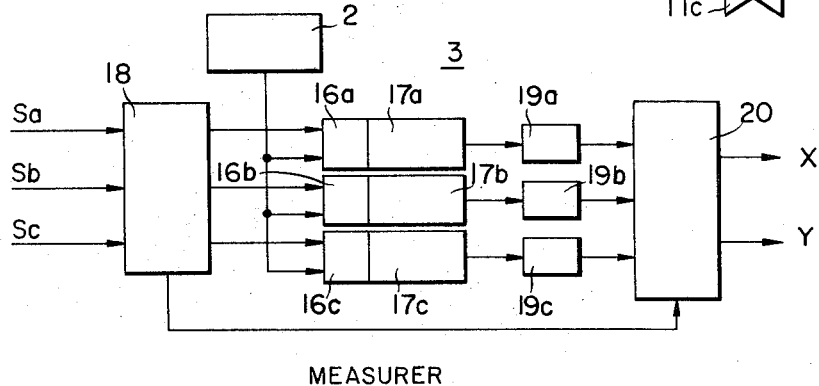
FIG. 4 is a block diagram of the measuring portion of the apparatus of this invention.

In FIG. 1, which shows the overall arrangement of the apparatus of this invention, a measuring ship 1 is floated on the sea. A controller 2 and means for measuring the position of a movable article under water, such as measuring equipment 3, are provided in this ship. On the top of an under-water service car 4 disposed on the bottom of the sea is mounted an ultrasonic transmitter 5. An ultrasonic receiver 6 is disposed at the standard point 0 predetermined on the bottom of the sea. Then, respective trigger pulses TR of constant period are transmitted from the controller 2 through the transmitter 5 so as to energize the pulse oscillator 8 of the transmitter 5 with the trigger pulses TR to oscillate transmitting pulses RP synchronized with the period of the trigger pulses. The pulses are then amplified by a power amplifier 9, and are supplied to a transmitter 10 from which pulse ultrasonic waves are transmitted through the water. The ultrasonic waves thus transmitted are received by three receivers 11a, 11b and 11c of the receiver 6 in which the received ultrasonic pulses Sa, Sb and Sc are amplified by the respective amplifiers 12a, 12b and 12c to be transmitted to the measuring equipment 3 through a cable 13. The ultrasonic receiver 6 is so constructed that a post 14 is erected at the standard point 0, three branches 15a, 15b and 15c are equidistantly projected radially in horizontal direction in space of 120° therebetween around the post 14 and the receivers 11a, 11b and 11c are mounted to the free ends of the respective branches 15a, 15b 15c.

As shown in FIG. 5, which shows the relationship of the relative position of the transmitter and receivers of this invention, since the receivers 11a, 11b and 11c are so disposed equidistantly with a space of 120° therebetween on a circular periphery around the standard point 0 as a center at a distance of R from the transmitter 10, the distance Ra, Rb and Rc of the respective receivers 11a, 11b and 11c with respect of the transmitter 10 are different from each other. Therefore, assuming that the relationship of the distances Ra, Rb and Rc is Ra<Rb<Rc, as shown in FIG. 6, which shows the timing relation of the trigger pulses, the transmitting pulse and received pulse of the apparatus of this invention, an initial received pulse $S_1$ is generated at the receiver 11a after the time of $\tau$ from the generation of the trigger pulse signal. Thereafter, the second received pulse $S_2$ is generated at the receiver 11b after the time of $t_1$, and then the third received pulse $S_3$ is generated at the receiver 11c after the time of $t_2$.

Assume that the distance R of the transmitter and receivers is now sufficiently large in comparison with the wavelength of the pulsing wave, the ultrasonic wave reaches the receivers as a plane wave, and accordingly assuming that C represents the velocity of sound (m/sec.), r represents the distances (m) between the standard point 0 and the respective receivers $11a$, $11b$ and $11c$, the times $t_1$ and $t_2$ may be obtained by the following formulae. It is assumed that the transmitter 10 is disposed at the position in the direction of $\alpha°$ with respect to the direction of the receiver $Sb$ from the straight line for connecting the receiver $11a$ and the standard point 0.

$$t_1 = 3r \cos\alpha - \sqrt{3}\, r \sin\alpha/2C \quad (1)$$

$$t_2 = 3r \cos\alpha + \sqrt{3}\, r \sin\alpha/2C \quad (2)$$

wherein C and r are constants, and if the times $t_1$ and $t_2$ are measured, the angle of $\alpha$ may be obtained, and if the time $\tau$ from when the transmitting pulse is generated to when initial received pulse $S_1$ is generated is multiplied by the constant C, the distance R may be obtained.

And, the components X and Y of the position of the underwater service car 4 may be obtained from the following formulae:

$$X = R \cdot C(t_1 + t_2/3r) \quad (3)$$

$$Y = R \cdot C(t_2 - t_1/\sqrt{3}\, r) \quad (4)$$

In this embodiment of the apparatus of this invention, the receiver pulse is fed to the measuring equipment 3, by which the respective received pulse from the receivers $11a$, $11b$ and $11c$ are measured in the generating order thereof so as to discriminate the area where the transmitter 10 is disposed, and by which the times $\tau$, $t_1$ and $t_2$ are measured and the position of the transmitter 10, i.e., the position of the under-water service car 4 is calculated by calculating means, and is indicated by X-Y recorder, oscilloscope, etc. More particularly, the measuring equipment 3 supplies the trigger pulse signal from the controller 2 to gates $16a$, $16b$ and $16c$ so as to open the gates to operate the following counters $17a$, $17b$ and $17c$, respectively. Then, the measuring equipment 3 feeds the received pulses $Sa$, $Sb$ and $Sc$ from the receivers $11a$, $11b$ and $11c$ to an area discriminating circuit 18 simultaneously to the gates $16a$. $16b$ and $16c$ so as to close the gates to stop the operation of the counters $17a$, $17b$ and $17c$.

Thus, since the respective counters $17a$, $17b$ and $17c$ operate to count from when they are energized by the triggers to when they are deenergized by the received pulses so as to measure the time from when the triggers or transmitted pulses are generated to when the respective received pulses are generated. The measured outputs from the measuring equipment 3 are then converted to analog value by D-A converters $19a$, $19b$ and $19c$, respectively, and are then supplied to arithmetic circuit 20. On the other hand, the area discriminating circuit 18 operates to discriminate the area where the transmitter, i.e., the under-water service car 4 is disposed from the received pulses $Sa$, $Sb$ and $Sc$ in the generating order so as to supply the discriminated output to the arithmetic circuit 20. The arithmetic circuit 20 calculates the position of the service car 4 from the outputs of the measuring equipment 3 and the outputs of the area discriminating circuit 18 to provide the outputs of X and Y components of the position of the service car 4.

Then, these outputs of X and Y components of the position of the service car 4 from the arithmetic circuit 20 are applied to display unit such as the X-Y recorder, or a oscilloscope to indicate the position of the service car 4.

The following formula is obtained from the formula (3):

$$\alpha = \cos^{-1}[C(t_1 + t_2)/3r] \quad (5)$$

From this formula as shown in FIG. 7, which shows another embodiment of the measuring equipment of the apparatus of this invention, the signal obtained by the above formula is supplied through a servo amplifier 21 to a servo motor 22 which rotates a resolver 23. Thus, using the rotating angle of this resolver 23 as a table signal of a recorder for indicating a polar coordinates and the distant signal R obtained as previously described, the position of the underwater service car 4 may be indicated.

In the aforementioned embodiment, though the outputs of the counters are fed through D-A converters to the arithmetic circuit, it may obtain the same effect by applying the outputs of the counters directly to the arithmetic circuit so as to calculate them in digital computation and then by converting the results thus obtained to analog value such as voltage by a D-A converter.

It should be understood from the foregoing description that since the apparatus of this application calculates the position of the movable article under water from the time difference of the time when the receivers initially receive the supersonic waves transmitted by the transmitter and the time when the respective receivers receive the supersonic waves, even through there exists echo reflected on the rocks on the bottom of the sea, the measurement and calculation of the position of the movable article under water are not affected by the echo because the echo is delayed in time with the result that the apparatus may detect the accurate position of the movable article under water.

What is claimed is:

1. An apparatus for detecting the position of a movable article under water comprising at least three ultrasonic receivers equidistantly disposed around a standard point provided at the bottom of a body of water and so disposed as to sequentially receive any transmitted signal, an ultrasonic transmitter mounted onto the movable article for transmitting ultrasonic pulse waves, means for measuring the difference in the time when any receiver initially receives the ultrasonic wave and the time when the respective additional receivers sequentially receive the ultrasonic wave, and means for calculating the position of the movable article relative to the receiver initially receiving the ultrasonic wave with reference to a standard point as a standard from the measured result of said measuring means can be compared and wherein said receivers comprise a post located at the standard point, a plurality of branches equidistantly projected radially in horizontal direction in space of 120 degrees distance therebetween around the post and a plurality of individual ultrasonic receivers mounted on the free ends of the respective branches.

2. An apparatus as set forth in claim 1, wherein said measuring means comprises a controller for generating a trigger pulse, a plurality of gates which open when they receive the signal from said controller, an area discriminating circuit for closing said gates when it receives the the pulse from the receivers, and a plurality of counters for counting the time from when said receivers are energized to when they are deenergized by the pulses.

3. An apparatus as set forth in claim 1, wherein said calculating means comprises an arithmetic circuit for calculating the position of the movable article under water from the output of said measuring means to provide X and Y components of the position of the movable article.

4. An apparatus as set forth in claim 1, wherein said calculating means comprises an arithmetic circuit for calculating the angular position and distant position of the movable article under water from the outputs of said measuring means to provide the $\tau$ and R components of the position of the movable article for indicating polar coordinates.

* * * * *